United States Patent Office 3,436,127
Patented Apr. 1, 1969

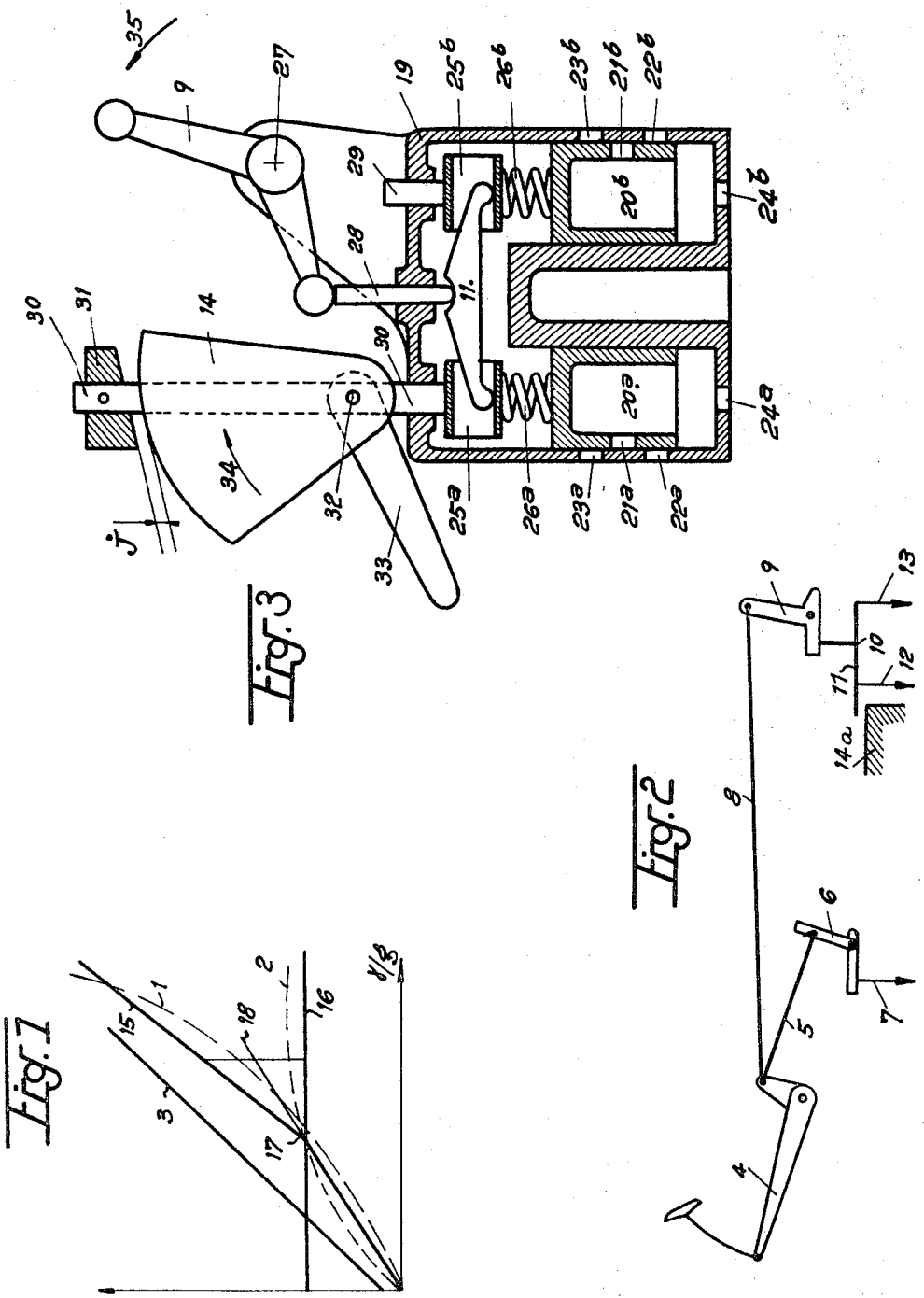

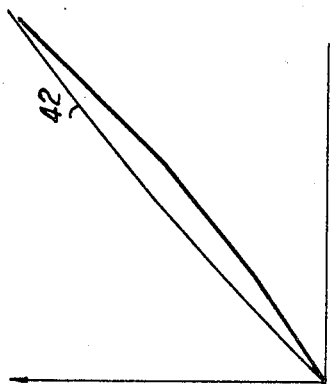
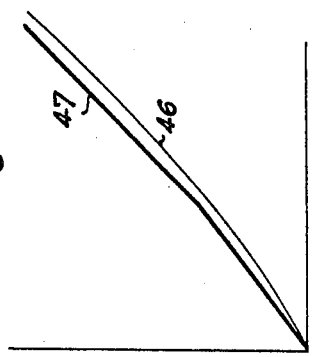
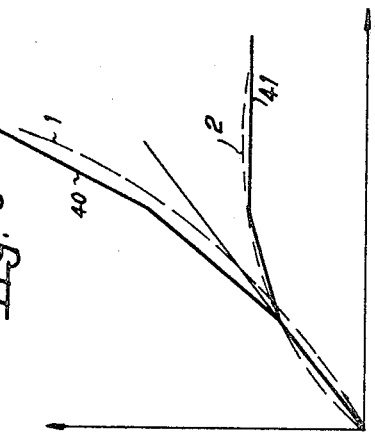
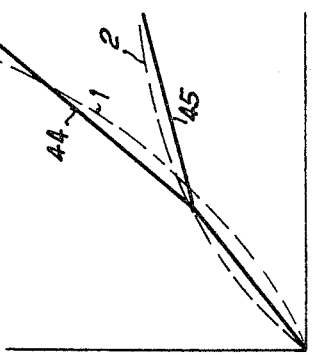
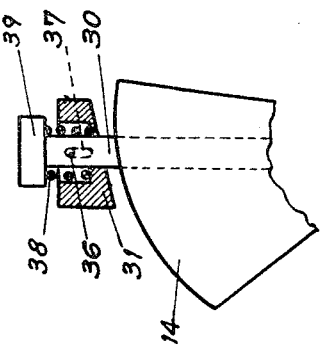
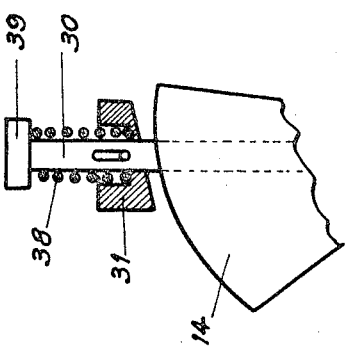

3,436,127
BRAKING APPARATUS FOR VEHICLES
Edmond Henry-Biabaud, Paris, France, assignor to Societe Anonyme Andre Citroen, Paris, France, a French company
Filed Jan. 19, 1967, Ser. No. 610,273
Claims priority, application France, Jan. 27, 1966, 47,472
Int. Cl. B65t *13/00;* B60t *8/18*
U.S. Cl. 303—7  8 Claims

ABSTRACT OF THE DISCLOSURE

A braking system for a tractor and trailer combination in which the braking force exerted on each of two axles of the tractor will be determined by the degree of deceleration thereof. The forward axle brakes and the rear axle brakes are energized with fluid from separate cylinders, the cylinders being actuated by an equalizing rod pushed toward them to operate the brakes, the cylinder in communication with the tractor's rear axle being capable of limited movement so that when a predetermined force is exerted at the center of the equalizing rod, any additional force will result only in movement of the piston in the forward brake cylinder.

---

This invention relates to braking apparatus for articulated vehicles.

In a vehicle the optimum braking force to be transmitted to each axle is proportional to the load supported by each said axle. Now in a motor vehicle, the load on the forward axle increases under the effect of deceleration due to braking while the load on the rear axle is reduced. On the other hand, the load on the trailing axle of an attached trailer remains substantially constant.

When a trailer or semi-trailer is coupled to a towing vehicle, the braking force to be applied to each axle must follow as a function of deceleration; i.e., a law of parabolic behaviour with an increasing slope for the front axle of the towing vehicle, a parabolic law of behaviour with a declining slope for its rear axle, and a substantially rectilinear law for the trailing axle. These laws are not followed, in practice, with the braking apparatus of semi-trailers or trailers proposed up to the present time.

The present invention has for its object braking apparatus for vehicles having several axles in particular for articulated vehicles, which enables, on the contrary, the generation of braking forces on different axles which have desired values.

The present invention provides braking apparatus for a vehicle having more than two axles, including balance means for distributing a control force between a braking circuit of one or more axles on which the load increases with deceleration and a braking circuit of one or more axles on which the load decreases with deceleration, means for limiting the displacement of a portion of the balance means controlling the braking circuit of the said one or more axles having said decreasing load, and a control member for controlling the braking circuit of one or more axles on which the load is substantially constant during deceleration, which is mechanically linked to an intermediate portion of the distributing balance means.

The present invention further provides brake apparatus for a vehicle having three or more axles, said apparatus comprising means for distributing the applied braking force between a brake fluid circuit of one or more said axles on which load increases with increasing rate of deceleration and a braking fluid circuit of one or more said axles on which load decreases with increasing rate of deceleration, means for limiting the displacement of a part of said distributing means controlling the brake circuit of the or each axle on which load decreases with increasing deceleration rate, and a control means for controlling the braking circuit of one or more said axles on which the load is substantially constant during deceleration, which control means is mechanically linked to an intermediate part of the distribution means.

The present invention still further provides braking apparatus for a vehicle having a first, a second and a third axle on which the load respectively increases, decreases and remains substantially constant on deceleration, said apparatus including a first, a second and a third braking circuit for applying braking action to said first, second and third axle respectively, a balance rod whose end portions control said first and second braking circuits respectively, control means for controlling simultaneously an intermediate portion of the balance rod and said third braking circuit, and limiting means for restricting the travel of one end portion of the rod whereby to limit the braking action on said second axle.

Several embodiments of braking apparatus in accordance with the present invention will now be described, by way of example, with reference to the accompanying diagrammatic drawings, in which:

FIGURE 1 shows graphically ideal braking curves and those which can be obtained with apparatus according to the invention;

FIGURE 2 is a diagram of the braking apparatus;

FIGURE 3 is a sectional view of a compensating valve assembly used in the apparatus of FIGURE 2;

FIGURE 4 is a detail of a modification of the valve assembly of FIGURE 3;

FIGURES 5 and 6 show graphically the braking curves obtained with the modified valve assembly of FIGURE 4;

FIGURE 7 is a detail of another modification of the valve assembly of FIGURE 3;

FIGURES 8 and 9 show graphically the braking curves obtained with the modified valve assembly of FIGURE 7.

Figure 10:
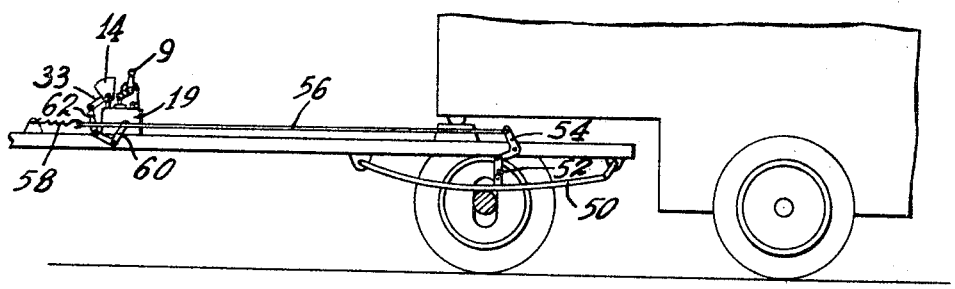
FIGURE 10 shows a mechanism which positions the abutment as a function of the load.

FIGURE 1 shows the ideal braking curve 1 of the front axle of a towing vehicle, the ideal braking curve 2 of the rear axle of the vehicle, and the ideal braking curve 3 of a trailing axle. The curve 3 is a substantially straight line in FIGURE 1 for the sake of simplification; however, it is, in fact, slightly concave downwardly in the case of a semi-trailer and upwardly in the case of a trailer.

FIGURE 2 shows diagrammatically a braking apparatus which enables these curves to be approximated satisfactorily.

The brake pedal 4 of the vehicle is connected by a system of rods 5 to a control lever 6 of a compensating valve assembly 7 for the trailer which system controls the braking of the semi-trailer. The pedal 4 is also connected by a system of rods 8 to a pivotal lever 9 which acts at an intermediate point 10 on a floating equalizing rod 11. The ends 12 and 13 of this balance rod control the compensating valve assembly which in turn controls respectively the braking of the rear axle and the front axle of the towing vehicle. An abutment 14a, whose position can be variable or non-variable with load, limits the displacement of the end 12 of the balance rod.

In the braking apparatus shown in FIG. 2, the abutment 14 is fixed so that the displacement of the end 12 of the balance rod will be limited to a valve which will not vary with load.

The actual braking curves 15 and 16 (FIGURE 1) for the front and for the rear axle consist of a common straight line up to the point when the balance rod meets the abutment 14a. At this point 17 the curves separate, the curve 16 becomes horizontal while the curve 15 slopes upwardly relative to their common portion; this slope 15 after point 17 is doubled if, for example, the point 10 is in the middle of the balance rod. The actual braking curve 18 for the trailer axle is, because of the mechanical connection between the point 10 of the rod 11 and the control lever 6, coincident with the common portion of the curves 15 and 16 and from the point 17 extends in a straight line. As seen in the drawings the practical braking curves come close to the ideal braking curves.

FIGURE 3 shows diagrammatically a compensating valve assembly for ensuring the desired braking force to the axles of a towing vehicle. This valve assembly comprises a body 19 in which are slidably mounted two hollow pistons 20a and 20b. The piston 20a has a orifice 21a movable into alignment with an orifice 22a of the body which is connected to a source of air under pressure or into alignment with an orifice 23a which is open to the atmosphere; each of these orifices 22a and 23a can communicate, by displacement of the piston 20a, with an orifice 24a connected to the rear brake cylinders. In a similar manner, displacement of the piston 20b provides for communication of the orifice 24b which is connected to the forward braking cylinders, with either an orifice 23b which is open to the atmosphere, or with an orifice 22b communicating with a source of air under pressure.

The floating balance rod 11 has its end portions engaged in sleeves 25a and 25b which act on the pistons 20a and 20b through compensating springs 26a and 26b, in opposition to the pressure acting respectively in front and rear braking cylinders.

The control lever 9, pivotally mounted at 27 on the body 19 and connected to the brake pedal, co-operates with a rod 28 applied against the centre part of the balance rod 11 and can cause displacement of the pistons 20a and 20b, so as to place the orifices 24a and 24b in communication with the feed orifices 22a and 22b.

The sleeve 25b is rigid with a simple guide rod 29 slidably mounted in the body 19. Whereas the sleeve 25a is rigid with a rod 30 which is similarly slidably mounted in the body 19 but on which is mounted an abutment 31.

The abutment 31 is engageable with a cam 14 which is pivotally mounted about a fixed point 32 and is rigid with a lever 33. This lever is connected to means which are shown in FIG. 10 and which will be explained infra which are sensitive to load variations on the rear axle and which means cause the lever to pivot in the sense of the arrow 34 when the load increases. As shown in the drawing the length of the radius vector of the cam adjacent the abutment 31 increases when the cam is displaced in the sense of the arrow 34.

When the brake pedal 4 is depressed, the lever 9 pivots in the sense of the arrow 35 so that the balance rod 11 is displaced parallel to itself only while the position of the rod 30 maintains a clearance J between the abutment 31 and the cam 14.

The movement of the balance rod 11 is transmitted by the sleeves and the springs to the pistons 20a and 20b until the piston orifices 21a and 21b become aligned with the feed orifices 22a and 22b so that brake fluid can be transmitted to the forward and rear brake cylinders. At the same time this brake fluid acts on the pistons 20a and 20b to compress the springs 26a and 26b until the compression of the springs equals the braking pressure. Thus the greater the braking pressure the more the springs 26a and 26b are compressed, that is to say the force exerted on the brake pedal 4 is itself greater; if the disposition of the springs 26a and 26b and of the pistons is symmetrical, the braking pressure is the same to the front and to the rear.

If the control force is increased the rod will cause the clearance J to be reached whereafter the abutment 31 comes into contact with the cam 14. If the force exerted on the pedal 4 is further increased, then only the piston 20b will continue to be displaced, the piston 20a being immobilised. Thus the pressure in the front braking circuit continues to increase while the pressure in the rear circuit remains constant. As the balance rod 11 pivots about its point of contact with the sleeve 25a which is, at this moment fixed, the pressure in the front braking circuit will be caused to increase more quickly than before; this increase is two fold if, as shown in FIGURE 3, the rod 28 acts at the middle of the balance rod 11.

The supply of the braking circuit of the semi-trailer is made through a simple compensated valve assembly, the movements of its control lever 6 being substantially proportional to those of the rod 28.

In the embodiment of FIGURE 3 the value, to which the rear braking pressure is limited, depends on the load since the angular position of the abutment 14, and thus the value of the clearance J, depend upon the load on the rear axle of the towing vehicle.

A simple mechanism which positions the abutment 14 as a function of the load on the rear axle of the towing vehicle is shown in FIG. 10. It shows the rear leaf spring 50 pivotally connected to one end of a link 52 which is pivoted at its other end to a crank 54. The crank 54 is pivoted at its central portion to the frame of the towing vehicle and is pivotally connected at its other end to the end of a rod 56. The end of the rod 56 farthest from the leaf spring 50 is secured by a spring 58 to the frame of the vehicle. The rod 56 is also pivotally connected to one end of a crank 60 which is pivotally connected at its central portion to the frame of the towing vehicle as is crank 54. The other end of the crank 60 is pivotally connected to a link 62 which is also pivotally connected to the lever 33.

Thus the higher the load on the rear wheel of the towing vehicle the farther the crank 54 will be pivoted in a clockwise direction under the action of the link 52. It follows that the rod 56 will be moved to the right to pivot the crank 60 in a clockwise direction as well as the lever 33 through the action of the link 62. As shown in FIG. 3, the abutment 14, which is in the form of a cam, will be pivoted in a clockwise direction to increase the value of the clearance J and thus the braking force which may be applied to the spring 26a by the balance rod 11.

In the modification of FIGURE 4, the abutment 31 is slidably mounted on the rod 30; a pin 36 carried by the rod and engaged in an aperture 37 of the abutment limits the relative sliding between these members. A spring 38, originally not compressed, is interposed between the base of a recess in the abutment 31 and a shoulder 39 at the end of the rod 30, and whose diameter is larger than that of the recess of the abutment.

Under these conditions, when the travel of the rod 30 exceeds the clearance J, the piston 20a continues to be displaced but less quickly than before, for the same travel of the rod 28, if the compression of the springs 38 opposes this displacement; conversely, piston 20b is displaced more rapidly than before. The variations in braking forces which will be the same for both the front and the rear become simply proportional. When the travel of the rod attains the clearance J+J1, J1 being the clearance between the shoulder 39 of the rod 30 and the abutment 31, the piston 20a is immobilised and the pressure in the rear brake circuit becomes constant.

The braking curves obtained, in practice, with the modification of FIGURE 4 are shown in FIGURE 5, the front braking force at 40 and the rear braking force at 41. FIGURE 6 shows an ideal braking curve 42 of a semi-trailer axle and the curve 43 obtained in practice. As seen the actual curves 40, 41 and 43 are extremely close to the ideal curves 1, 2 and 42.

In the modification of FIGURE 7, the shoulder 39 is sufficiently spaced from the abutment 32 so as not to be able to contact it. Under these conditions, when the abutment 31 meets the cam 14, the rear braking force continues to increase, but the rate of change of this braking force becomes less than that of the front braking force.

FIGURE 8 shows the practical braking curves 44 and 45 obtained. FIGURE 9 shows the ideal braking curve 46 for the axles of a trailer and the curve actually obtained 47.

By modifying the length of any of the lever arms of the system of rods, in particular that of the balance rod 11 or by modifying the section of the pistons 20a and 20b, it is possible to resolve any braking problem. The variation with load of the limiting value of the rear braking force can be controlled whatever the load on the rear axle.

Furthermore, the invention is equally applicable to articulated vehicles having more than three or four axles, as well as to rigid vehicles having several axles. In the latter case, control must be exercised appropriately on the front axle, the rear axle and the trailing axle respectively in accordance with the axle on which the load increases with deceleration, or the axle on which the load decreases with deceleration or the axle on which the load remains substantially constant. Whereas, in the case of a trailer, the value assembly 7 can be replaced by a compensating valve assembly, for example of the type which is shown in the FIGURE 3, so as to cause it to vary as a function of deceleration, the distribution of braking forces on the axles of the trailer. There should be a mechanical connection between the control lever controlling the pressure on the trailer axles and the balance rod, distributing the control force between the axles having a load increasing with deceleration and those having a load decreasing with deceleration.

I claim:

1. In braking apparatus for a vehicle having a first, a second and a third axle on which the load respectively increases, decreases and remains substantially constant on deceleration:
   said apparatus comprising
   a first braking circuit for applying a braking action to said first axle,
   a second braking circuit for applying a braking action to said second axle,
   a third braking circuit for applying a braking action to said third axle,
   a balance rod having first and second end portions and an intermediate portion, said first and second end portion controlling said first and second braking circuit respectively,
   control means for exerting a force at a fixed point in the intermediate portion of the balance rod and simultaneously controlling said third braking circuit, and
   limiting means for restricting the travel of said second end portion of the rod so that when the travel of said second end portion is restricted, additional force exerted on said intermediate portion will result in the exertion of a controlling force on said first braking circuit by said first end portion which is greater than the force exerted by said second end portion on said second circuit, 2. Apparatus according to claim 1 wherein said limiting means comprises a fixed abutment surface and a second abutment surface connected with said second end portion.

3. Apparatus according to claim 1 wherein said limiting means includes a fixed abutment surface and a second abutment surface which is movable so that the position thereof depends on the load on said second axle.

4. Apparatus according to claim 3 wherein a spring mounted between said abutment surfaces so that it progressively restricts the travel of said second end portion after a fixed displacement of said second end portion has been exceeded.

5. Braking apparatus for a vehicle having more than two axles, the improvement comprising
   a first braking circuit of at least one axle on which the load increases with deceleration,
   a second braking circuit of at least one axle on which the load decreases with deceleration,
   a third braking circuit of at least one axle on which the load remains substantially constant with deceleration,
   a balance rod having first and second portions for distributing a braking force between said first and second braking circuits respectively,
   means for exerting a control force on said rod,
   means for limiting the displacement of the second portion of the balance rod controlling said second braking circuit, so that the exertion of any additional control force results in the distribution of a greater braking force to said first circuit than said second circuit.

6. Apparatus according to claim 5 including means for limiting the displacement of the said second portion of the balance means to a fixed value corresponding to a given value of deceleration.

7. Apparatus according to claim 5 including means for limiting the displacement of said second portion to a value proportional to the load of said vehicle.

8. Apparatus according to claim 5 including a spring which biases said second portion against movement, said spring being actuated after a predetermined position has been reached by the balance rod.

References Cited

UNITED STATES PATENTS 3,284,141 11/1966 Henry-Biabaud ____ 303—53 XR

FOREIGN PATENTS 1,120,264 4/1956 France.

MILTON BUCHLER, *Primary Examiner.*

JOHN J. McLAUGHLIN, JR., Assistant Examiner.

U.S. Cl. X.R.

303—22, 53